United States Patent [19]
Tsujimoto et al.

[11] Patent Number: 4,816,523
[45] Date of Patent: Mar. 28, 1989

[54] N-CHYDROXYPHENYL)MALEIMIDE-ISOBUTYLENE COPOLYMER

[75] Inventors: Nobuhiro Tsujimoto; Michinori Suzuki; Jiro Hiromoto, all of Ichihara, Japan

[73] Assignee: Ube Industries, Ltd., Ube, Japan

[21] Appl. No.: 146,245

[22] Filed: Jan. 20, 1988

Related U.S. Application Data

[62] Division of Ser. No. 946,692, Dec. 24, 1986, Pat. No. 4,740,561.

[30] Foreign Application Priority Data

Dec. 25, 1985 [JP] Japan .................. 60-296478
Dec. 25, 1985 [JP] Japan .................. 60-296479
Mar. 25, 1986 [JP] Japan .................. 61-66364
Apr. 22, 1986 [JP] Japan .................. 61-92662

[51] Int. Cl.⁴ .......................... C08F 222/40
[52] U.S. Cl. ..................... 525/380; 526/262
[58] Field of Search ............ 526/262; 525/380

[56] References Cited
FOREIGN PATENT DOCUMENTS 0188904 7/1986 European Pat. Off. ............ 526/262

Primary Examiner—Harold D. Anderson
Assistant Examiner—T. Mason
Attorney, Agent, or Firm—Frishauf, Holtz, Goodman & Woodward

[57] ABSTRACT

An N-(hydroxyphenyl)maleimide-isobutylene copolymer having the following repeating units:

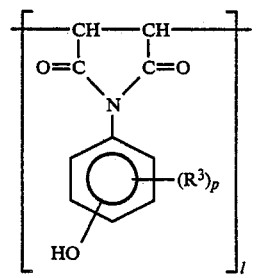

(I)

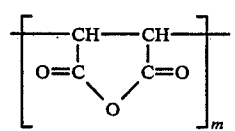

(II)

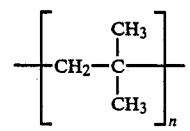

(III)

wherein $R^3$ is a halogen atom or a lower alkyl group having 1-5 carbon atoms; l, m and n are numbers satisfying conditions of $0.01 < n/(l+m) \leq 10$ and $0.2 < l/(l+m) \leq 1$; and p is an integer of 0-4.

2 Claims, 7 Drawing Sheets

N-(HYDROXYPHENYL)MALEIMIDE-ISOBUTYLENE COPOLYMER

This is a division of application Ser. No. 946,692 filed Dec. 24, 1986, now U.S. Pat. No. 4,740,561.

BACKGROUND OF THE INVENTION

1. Field of the Invention

The present invention relates to a process for the preparation of N-(hydroxyphenyl)maleimide copolymers and further relates to a novel copolymer belonging to the N-(hydroxyphenyl)maleimide copolymers.

2. Description of Prior Arts

N-(hydroxyphenyl)maleimide copolymers are soluble in organic solvents such as dimethylformamide, cyclohexanone, tetrahydrofuran and ethylcellosolve, and accordingly are of value as material for forming a thin coating layer. Moreover, since the N-(hydroxyphenyl)maleimide copolymers have phenolic hydroxyl groups and hence are soluble in an aqueous alkaline solution, these polymers are of value as base polymers of light-sensitive resins. Further, the N-(hydroxyphenyl)maleimide copolymers find various uses as heat-resistant resins.

Known processes for preparing N-(hydroxyphenyl)maleimide copolymers are described below.

Kobunshi Kagaku (Polymer Chemistry, in Japanese), Vol. 26, pp. 598(1968) describes a process for preparing N-(p-hydroxyphenyl)maleimide-styrene copolymer containing a relatively large amount of repeating unit derived from N-(p-hydroxyphenyl)maleimide which comprises copolymerizing N-(p-hydroxyphenyl)maleimide monomer (which has been prepared through transesterification) and styrene.

Preprint of the 7th Photopolymer Conference (held at Ellenville, N.Y. 1985) describes at page 35 a process for synthesis of N-(p-hydroxyphenyl)maleimide-styrene copolymer (1:1 molar ratio copolymer) comprises copolymerization of N-(p-acetoxyphenyl)maleimide monomer and styrene and subsequent transesterification of the resulting copolymer.

These known processes for the preparation of N-(p-hydroxyphenyl)maleimide-styrene copolymer require transesterification at a stage prior to or after the copolymerization in which an esterified hydroxyl group is converted into hydroxyl group. This is because an imide compound having hydroxyl group such as the above-stated N-(p-hydroxyphenyl)maleimide monomer is hardly prepared by conventional processes for the preparation of imide compounds.

As the conventional process for the preparation of imide compounds, there is well known a process comprising reaction of an amino compound and maleic anhydride in the presence of a basic catalyst such as triethylamine or sodium acetate and an acid anhydride-type dehydrating agent such as acetic anhydride, propionic anhydride or benzoic anhydride. This known process is not appropriately applied to the preparation of maleimide monomer from aminophenol and maleic anhydride, because hydroxyl group of aminophenol is predominently esterified and hence the desired imide compound having hydroxyl group is not produced in a high yield.

For the reason, the known process for the preparation of N-(p-hydroxyphenyl)maleimide-styrene copolymer involves transesterification of maleimide having an esterified hydroxyl group as described in Belgian Pat. No. 613,801, whereby returning the esterified hydroxyl group to hydroxyl group at either stage where it is in the form of a monomer or a polymer.

Thus, the known process for the preparation of N-(p-hydroxyphenyl)maleimide-styrene copolymer requires a stage of transesterification for returning the eserified hydroxyl group to hydroxyl group prior to or after the copolymerization reaction. The transesterification reaction needs a long time of period, and hence the known process is not favorably utilized in industry due to economical disadvantage. Another disadvantageous aspect of the known process resides in that the desired copolymer of maleimide monomer and styrene is not produced in a high yield because the double bond of maleic anhydride is attacked by the aminophenol in the stage of the production of maleimide monomer from the aminophenol and maleic anhydride.

SUMMARY OF THE INVENTION

An object of the present invention is to provide a novel process for the preparation of N-(hydroxyphenyl)maleimide copolymers.

Another object of the present invention is to provide a novel process for the preparation of N-(hydroxyphenyl)maleimide copolymers in high yields.

A further object of the invention is to provide a novel N-(hydroxyphenyl)maleimide copolymer.

In the first embodiment, there is provided by the present invention a process for the preparation of an N-(hydroxyphenyl)maleimide copolymer having the following repeating units:

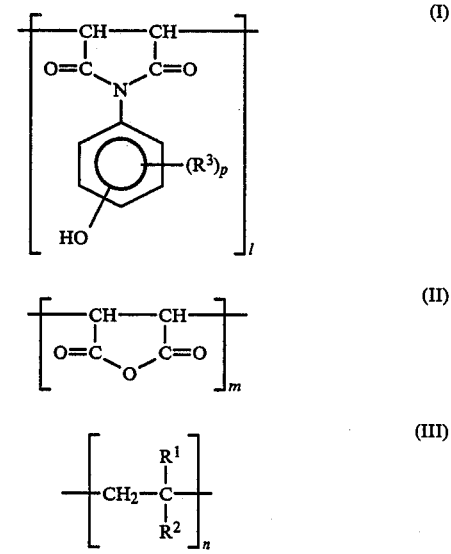

wherein $R^1$ is hydrogen, an aryl group, an alkyl group having 1–16 carbon atoms or a cycloalkyl group; $R^2$ is hydrogen or a lower alkyl group having 1–5 carbon atoms; $R^3$ is a halogen atom of a lower alkyl group having 1–5 carbon atoms; l, m and n are numbers satisfying conditions of $0.01 < n/(l+m) \leq 10$ (preferably, $0.1 < n/(l+m) \leq 5$) and $0.1 < l/(l+m) \leq 1$ (preferably, $0.3 \leq l/(l+m) \leq 1$); and p is an integer of 0–4, which comprises reaction of a copolymer of maleic anhydride and a unsaturated hydrocarbon having the repeating units:

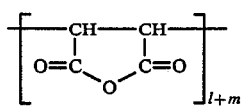
(II)

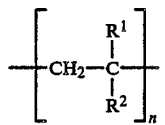
(III)

wherein $R^1$ and $R^2$ have the same meanings as above; and $l+m$ and $n$ are numbers satisfying conditions of $0.01 < n/(l+m) \leq 10$ (preferably, $0.1 < n/(l+m) \leq 5$), and an aminophenol having the formula:

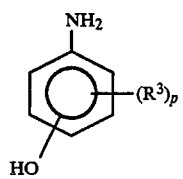
(IV)

wherein $R^3$ and $p$ have the same meanings as above, in an organic solvent.

In the second embodiment, the invention provides a process for the preparation of an N-(hydroxyphenyl)-maleimide copolymer having the following repeating units:

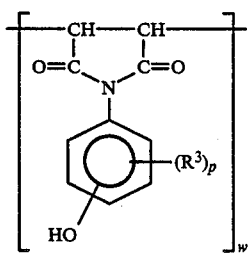
(VI)

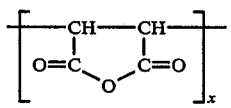
(VII)

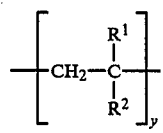
(VIII)

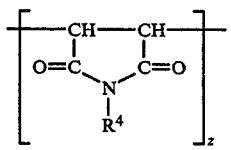
(IX)

wherein $R^1$ is hydrogen, an aryl group, an alkyl group having 1-16 carbon atoms or a cycloalkyl group; $R^2$ is hydrogen or a lower alkyl group having 1-5 carbon atoms; $R^3$ is a halogen atom or a lower alkyl group having 1-5 carbon atoms; $R^4$ is an aryl group, an alkyl group having 1-16 carbon atoms or a cycloalkyl group; w, x, y and z are numbers satisfying conditions of $0 < y/(w+x+z) \leq 10$ (preferably, $0 < y/(w+x+z) \leq 5$) and $0 < (w+z)/(w+x+z) \geq 1$ (preferably, $0.3 \leq (w+z)/(w+x+z) \leq 1$), and $0 < w/(w+z) < 1$ (preferably, $0.3 \leq (w+z)/(w+x+z) \leq 0.9$); and p is an integer of 0-4, which comprises reaction of a copolymer of maleic anhydride and a unsaturated hydrocarbon having the repeating units:

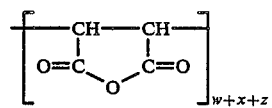
(VII)

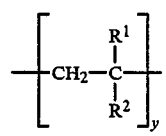
(VIII)

wherein $R^1$ and $R^2$ have the same meanings as above; and $w+x+z$ and $y$ are numbers satisfying conditions of $0 < y/(w+x+z) \leq 10$ (preferably, $0 < y/(w+x+z) \leq 5$), an aminophenol having the formula:

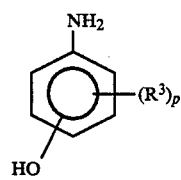
(X)

wherein $R^3$ and $p$ have the same meanings as above, and a primary amine having a group of $-R^4$ and having no group solubilizing the amine body in an aqueous alkaline solution, in an organic solvent.

Among the above-described copolymers, an N-(hydroxyphenyl)maleimide-isobutylene copolymer having the following repeating units:

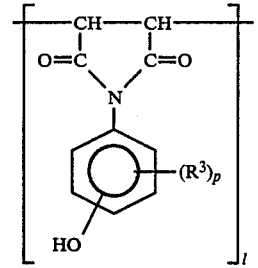
(I)

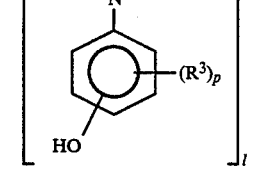
(II)

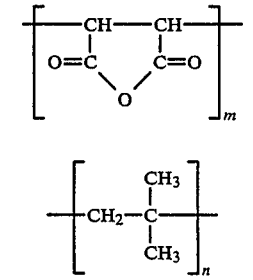
(III)

wherein $R^3$ is a halogen atom or a lower alkyl group having 1-5 carbon atoms; l, m and n are numbers satisfying conditions of $0.01 < n/(l+m) \leq 10$ (preferably, $0.1 < n/(l+m) \leq 5$, more preferably $0.5 \leq n/(l+m) \leq 3$) and $0.2 < l/(l+m) \leq 1$ (preferably, $0.4 \leq l/(l+m) \leq 1$, more preferably, $0.6 \leq l/(l+m) \leq 1$); and p is an integer of 0–4, is a novel polymer.

DETAILED DESCRIPTION OF THE INVENTION

Figure 1:
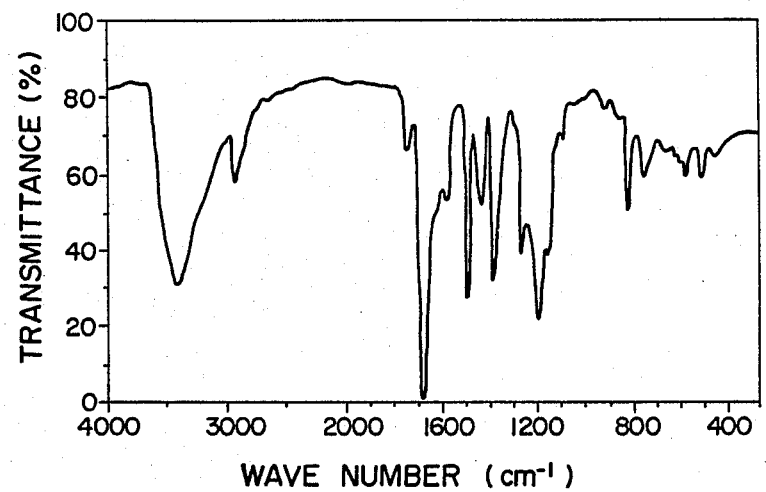
FIGS. 1–13 show IR spectra of N-(hydroxyphenyl)-maleimide copolymers of the invention.

The process of the above-mentioned first embodiment is first described.

The process for the preparation of the N-(hydroxyphenyl)maleimide of the invention comprises reaction of a copolymer of maleic anhydride and an unsaturated hydrocarbon having the specified repeating units, and an aminophenol.

The copolymer of maleic anhydride and an unsaturated hydrocarbon (hereinafter referred to as maleic anhydride copolymer) which is employed as one of the starting compounds has the following repeating units:

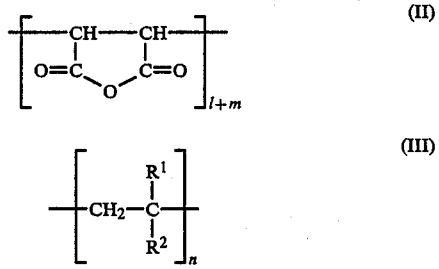

In the formulae (II) and (III):

$R^1$ is hydrogen, an aryl group such as phenyl, methylphenyl or naphthyl, and alkyl group having 1–16 carbon atoms such as methyl, ethyl, propyl, butyl, pentyl, hexyl, octyl decyl or dodecyl, or a cycloalkyl group such as cyclohexyl;

$R^2$ is hydrogen or a lower alkyl group having 1–5 carbon atoms such as methyl, ethyl, propyl, butyl or pentyl; and m and n are numbers satisfying conditions of $0.01 < n/(l+m) \leq 10$, preferably, $0.1 < n/(l+m) \leq 5$, in which the value of $n/(c+m)$ indicates molar ratio of the repeating unit (III) to total of the repeating units (II) and (III).

Examples of hydrocarbons giving the repeating unit (III) include styrene, α-methylstyrene, vinylnaphthalene, isobutylene, 3-methylbutene-1, hexene-1 and vinylcyclohexene.

If the molar ratio of the repeating unit (III) to the repeating units (II) and (III), namely $n/(l+m)$, exceeds 10, the resulting N-(hydroxyphenyl)maleimide coplymer shows poor heat resistance like that of a homopolymer of an unsaturated hydrocarbon and hence it hardly is employable as a base polymer of a light-sensitive polymer. If the $n/(l+m)$ is extremely small, the resulting N-(hydroxyphenyl)maleimide copolymer shows poor film-forming property and hence the resulting film is weak or brittle. The above-mentioned maleic anhydride copolymer preferably has a number average molecular weight ($\overline{Mn}$) in the range of 1,000 to 500,000.

The aminophenol which is employed as another starting compound has the formula:

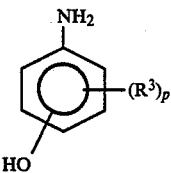

In the formula (IV), $R^3$ is a halogen atom such as chloride or bromine, or a lower alkyl group having 1–5 carbon atoms such as methyl, ethyl, propyl, butyl, pentyl, and p is 0, 1, 2, 3 or 4. p is preferably 0, 1 or 2.

Examples of the aminophenol include o-aminophenol, m-aminophenol, p-aminophenol, 3-methyl-p-aminophenol, 2-methyl-p-aminophenol, 4-chloro-o-aminophenol, 2-chloroo-p-aminophenol, 4-aminocatechol and 5-amino-2-hydroxy-p-xylene-3,5-dibrom-4-aminophenol.

In carrying out the reaction, the aminophenol is preferably employed in an amount of not more than 10 moles, more preferably not more than 2 moles, per 1 mole of the maleic anhydride repeating unit (II) of the maleic anhydride copolymer.

The organic solvent to be employed in the reaction preferably is a polar solvent such as dimethylformamide, dimethylsulfoxide, N-methyl-2-pyrrolidone, hexamethylene-phosphoramide or cyclohexanone.

The amount of the organic solvent varies depending upon the molecular weight and solubility of the maleic anhydride copolymer involved. The organic solvent is employed generally in an amount of 10—200 ml, preferably 20—100 ml, per 10 g of the maleic anhydride copolymer.

The process of the present invention can be carried out by the following processes.

(1) A maleic anhydride copolymer and an aminophenol are heated in an organic solvent such as dimethylformamide to 0°–150° C., preferably 10°–100° C., more preferably 50°–100° C. for 1–20 hours to convert a portion or whole of the maleic anhydride units into N-(hydroxyphenyl)maleamic acid unit. To the reaction mixture is added a tertiary amine catalyst, and is further added an azeotropic agent (i.e., azeotropic solvent) such as toluene or xylene for removing water produced upon cyclization-dehydration reaction. The resulting mixture is then heated to 80°–200° C., preferably 100°–150° C., for 1–20 hours for performing a cyclization-dehydration reaction, to obtain the desired N-(hydroxyphenyl)-maleimide copolymer.

(2) A maleic anhydride copolymer and an aminophenol are heated in an organic solvent such as dimethylformamide to 0°–150° C., preferably 10°–100° C., more preferably 50°–100° C., for 1–20 hours in the presence of a tertiary amine catalyst, and subsequently heated to 80°–200° C., preferably 100°–150° C., for 1–20 hours upon addition of an azeotropic agent such as toluene or xylene. Thus, a portion or whole of the maleic anhydride units of the copolymer is converted into N-(hydroxyphenyl)maleamic acid unit, which is further converted into the desired N-(hydroxyphenyl)maleimide copolymer through cyclization-dehydration.

(3) A maleic anhydride copolymer and an aminophenol are heated in an organic solvent such as dimethylformamide to 80°–200° C., preferably 100°–150° C., for 1–20 hours in the presence of a tertiary amine catalyst and an azeotropic agent such as toluene or xylene. Thus, a portion or whole of the maleic anhydride units of the copolymer is converted into N-(hydroxyphenyl)-maleamic acid unit, which is further converted into the desired N-(hydroxyphenyl)maleimide copolymer through cyclization-dehydration.

In any of the processes (1)-(3) above, the cyclization-dehydration reaction can be performed in the absence of an azeotropic agent by heating the reaction mixture to 100°-200° C. to remove the produced water. The dehydration reaction can be favorably performed by passing a nitrogen gas into the reaction mixture.

Examples of the tertiary amine catalyst employable in the reaction of the maleic anhydride copolymer and the aminophenol include triethylamine, tri-n-propylamine, tri-n-butylamine, tri-isobutylamine, tri-n-pentylamine, tri-n-hexylamine, tri-n-octylamine, pyridine, N-ethyl-morpholine, N-dimethylbenzylamine and isoquinoline.

The teriary amine catalyst is generally employed in an amount ranging from 0.01 to 2 moles, preferably from 0.1 to 1 mole, per one mole of the maleic anhydride unit of the maleic anhydride copolymer.

Examples of the azeotropic agent for removing water produced upon the cyclization-dehydration include benzene, toluene and xylene.

The azeotropic solvent is used in an amount enough for azeoptropically removing the produced water. One mole of water is produced from one mole of an N-(hydroxyphenyl)maleamic acid unit which is formed by the reaction of the aminophenol and the maleic anhydride unit of the maleic anhydride copolymer. Ordinarily, the azeotropic agent is employed under reflux with continuously removing a distilled water. The azeotropic agent is generally used in not more than one volume, preferably 0.5 volume, per one volume of the reaction solvent.

The azeotropic agent can be dividedly added to the reaction mixture with the progress of the reaction or can by recycled through reflux with continuous removal of the produced water.

The processes (1) and (2) above involve two stages for performing the reaction of the maleic anhydride copolymer and the aminophenol. In these processes, the first step for producing an N-(hydroxyphenyl)maleamic acid copolymer through the reaction between the maleic anhydride copolymer and the aminophenol is carried out generally at 0°-150° C., preferably at 10°-100° C. The reaction hardly proceeds at temperatures of lower than 0° C. At temperatures of higher than 150° C., water produced upon cyclization-dehydration of the in-situ formed N-(hydroxyphenyl)maleamic acid unit is apt to react with the unreacted anhydride ring, and further side-reactions involving the hydroxyl group easily take place.

The second step for the cyclization-dehydration of the N-(hydroxyphenyl)maleamic acid copolymer in the processes (1) and (2), as well as the process involving the singe step for the reaction of the maleic anhydride copolymer and the aminophenol in the presence of the tertiary amino catalyst and the azeotropic agent is generally carried out at 80°-200° C., preferably 100°-150° C. The reactions hardly proceed at temperatures of lower than 80° C., and at temperatures of higher than 200° C., side reactions involving the hydroxyl group and intermolecular reactions occur.

The reaction period of reaction between the maleic anhydride copolymer and the aminophenol varies depending upon the reaction temperature, the amount of the aminophenol introduced, the desired reaction ratio (ratio of conversion from the maleic anhydride unit of the maleic anhydride copolymer to N-(hydroxyphenyl)maleamic acid). Generally, the reaction period of the first step for production of N-(hydroxyphenyl)maleamic acid copolymer ranges from 1 to 20 hours, and the reaction period of the second step for cyclization-dehydration of the produced copolymer ranges from 1 to 20 hours.

The reaction period of the one-step reaction in the presence of a tertiary amine catalyst and an azeotropic agent generally ranges from 1 to 20 hours.

The content of the N-(hydroxyphenyl)maleimide unit in the desired N-(hydroxy)maleimide copolymer can be easily controlled by adjusting the amount of the aminophenol used, the reaction temperature, and the reaction period.

The produced N-(hydroxyphenyl)maleimide copolymer can be readily recovered by adding a poor solvent such as water or an ether to the reaction mixture, whereby precipitating the product.

Thus, an N-(hydroxyphenyl)maleimide copolymer having the following repeating units:

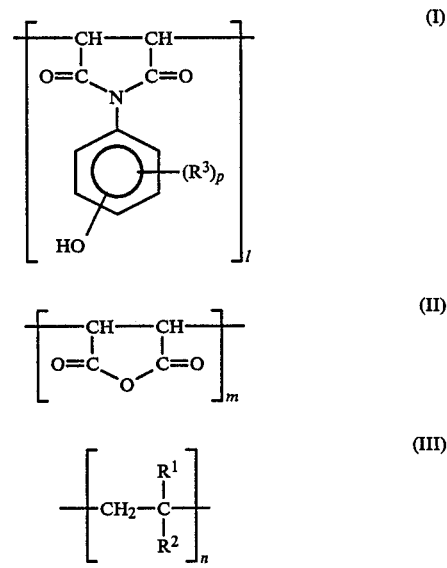

wherein $R^1$ is hydrogen, an aryl group, an alkyl group having 1-16 carbon atoms or a cycloalkyl group; $R^2$ is hydrogen or a lower alkyl group having 1-5 carbon atoms; $R^3$ is a halogen atom or a lower alkyl group having 1-5 carbon atoms; l, m and n are numbers satisfying conditions of $0.01 < n/(l+m) \leq 10$ and $0.1 < l/(l+m) \leq 1$; and p is an integer of 0-4, is produced.

The above-mentioned process is advantageously employed for the preparation of N-(hydroxyphenyl)maleimide copolymer, because the process gives the desired copolymer in a high yield, and the molar ratio of the repeating units in the resulting copolymer can be easily varied by selecting an appropriate starting maleic anhydride copolymer and controlling the ratio of the amounts of the starting compounds.

Among thus obtained copolymer, an N-(hydroxyphenyl)-maleimide-isobutylene copolymer having the following repeating units:

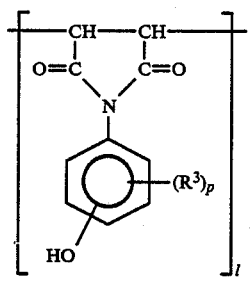  (I)

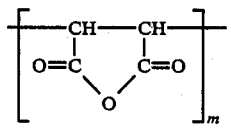  (II)

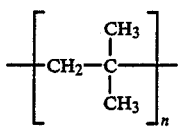  (III)

wherein R³ is a halogen atom or a lower alkyl group having 1-5 carbon atoms; l, m and n are numbers satisfying conditions of $0.01 < n/(l+m) \leq 10$ (preferably, $0.1 < n/(l+m) \leq 5$, more preferably $0.5 \leq n/(l+m) \leq 3$) and $0.2 < l/(l+m) \leq 1$ (preferably, $0.4 \leq l/(l+m) \leq 1$, more preferably, $0.6 \leq l/(l+m) \leq 1$); and p is an integer of 0-4, is a novel polymer.

This novel N-(hydroxyphenyl)maleimide-isobutylene copolymer shows higher flexibility when is formed as a film, as compared with the known N-(p-hydroxyphenyl)-maleimide-styrene copolymer. This improved flexibility is thought to be due to the presence of the isobutylene unit. Accordingly, the N-(hydroxyphenyl)-maleimide-isobutylene copolymer can be coated very uniformly and tightly on a substrate.

The N-(hydroxyphenyl)maleimide copolymer of the second embodiment having the following repeating units:

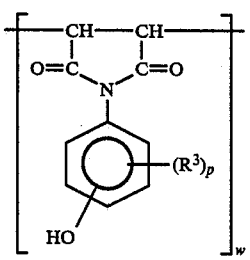  (VI)

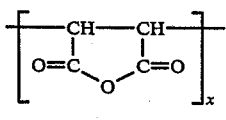  (VII)

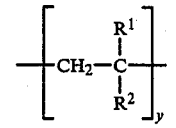  (VIII)

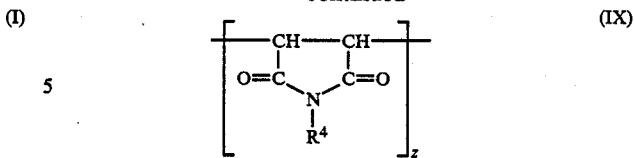  (IX)

wherein R¹ is hydrogen, an aryl group, an alkyl group having 1-16 carbon atoms or a cycloalkyl group; R² is hydrogen or a lower alkyl group having 1-5 carbon atoms; R³ is a halogen atom or a lower alkyl group having 1-5 carbon atoms; R⁴ is an aryl group, an alkyl group having 1-16 carbon atoms or a cycloalkyl group; l, m, n and q are numbers satisfying conditions or $0 < y/(w+x+z) \leq 10$ and $0 < (w+z)/(w+x+z) \leq 1$, and $0 < w/(w+z) 21$ 1; and p is an integer of 0-4, can be prepared in essentially the same manner as the manner of the first embodiment, except that a primary amine having a group of —R⁴ and having no group solubilizing the amine body in an aqueous alkaline solution is employed in addition to the aminophenol.

Accordingly, the process of the second embodiment can be performed in essentially the same manner as in the herebefore-described process of the first embodiment except that the single use of the aminophenol is replaced with the combined use of the aminophenol and the primary amine.

Examples of the group solubilizing the amine body in an aqueous alkaline solution include hydroxyl and carboxyl groups.

Examples of the primary amine employable in the invention include aromatic primary amines such as o-aminotoluene, m-aminotoluene, p-aminotoluene, 2,3-xylidine, 2,4-xylidine, 2,5-xylidine, 2,6-xylidine, 3,4-xylidine, 3,5-xylidine, aminoethylbenzene, aminoisopropylbenzene, and amino-t-butylbenzene; aliphatic primary amines such as methylamine, ethylamine, propylamine, butylamine, hexylamine, octylamine and dodecylamine; and cyclic primary amines such as cyclohexylamine.

The total amount of the aminophenol and the primary amine can be not more than 2 moles, preferably not more than 1.5 moles, per one mole of the maleic anhydride copolymer.

The primary amine can be employed in an amount of 0.05-4 moles, preferably 0.1-2 moles, per one mole of the aminophenol.

The present invention is further described by referring to the following examples.

In the examples, the conversion ratio of maleic anhydride unit of the starting maleic anhydride copolymer into N-(hydroxyphenyl)maleimide was calculated from the nitrogen content of the obtained N-(hydroxyphenyl)maleimide copolymer. The conversion ratio is expressed by the ratio of the N-(hydroxyphenyl)maleimide unit of the product to the maleic anhydride unit of the starting copolymer, that is, $(l/l+m) \times 100$ or $(w+z/w+x+z) \times 100$. IR spectrum was measured according to KBr pellet method. The number average molecular weight ($\overline{Mn}$) is a value converted into that of polystyrene which is obtained according to GPC method utilizing tetrahydrofuran as solvent and a calibration curve of a reference polystyrene. The glass transition temperature (Tg) was determined using Dupont 990 thermal analyzer DSC.

EXAMPLE 1

In a 200-ml volume four-necked flask equipped with a stirrer, a thermometer, a water receiver (i.e., water content-measurable receiver) and a nitrogen inlet were placed 10 g of maleic anhydride-isobutylene copolymer (copolymerization ratio=1:1, ISOBAN-04, tradename, Kuraray Isoprene Chemical Co., Ltd., Japan) and 50 ml of anhydrous dimethylformamide. The mixture was stirred to convert it into a solution, and in the solution was dissolved 14.2 g of p-aminophenol. The resulting solution was heated to 80° C. for 9 hours under stirring to prepare N-(p-hydroxyphenyl)maleamic acid copolymer—First Step. To the reaction mixture were added 7 g of tri-n-butylamine and 15 ml of toluene. The resulting mixture was heated 140° C. under passing a nitrogen gas into the mixture to distil off water (which was produced by cyclization-dehydration reaction) together with toluene into the water receiver. After lapse of one hour, 10 ml of toluene was added to the reaction mixture. This cyclization-dehydration reaction was continued for 8 hours under returning distilled toluene from the water receiver—Second Step.

After the reaction was complete, the reaction mixture was cooled to a temperature lower than 40° C. and poured into 300 ml of ethyl ether to precipitate the obtained polymer. The mixture was allowed to stand and the supernatant was removed. The precipitated polymer was washed with 200 ml of ethyl ether and dissolved in 150 ml of tetrahydrofuran (THF). The resulting solution was dropped into 700 ml of ethyl ether to precipitate a powdery polymer. The polymer was collected by filtration and purified by the above THF dissolution-ethyl ether precipitation procedure. Thus purified polymer was dried under vacuum at 100° C. for 24 hours to give 15 g of N-(p-hydroxyphenyl)-maleimide-isobutylene copolymer.

Elementary analysis gave C: 67.85% (68.55%), H: 6.20% (6.12%), N: 5.80% (5.71%), in which the values in the parenthesis are theoretical values based on the imidation ratio of 100%. Accordingly, it was confirmed that 100% of the maleic anhydride units of the starting maleic anhydride-isobutylene copolymer was converted into N-(p-hydroxyphenyl)maleimide units. The number average molecular weight ($\overline{Mn}$) was 42,400 and the glass transition temperature was 220° C.

The IR spectrum of the product is shown in FIG. 1. As is shown in FIG. 1, there are observed an absorption assigned to phenolic OH at 3,400 cm$^{-1}$, an absorption assigned to carbonyl of imide at 1,700 cm$^{-1}$ and an absorption assigned to para-substituted phenyl at 830 cm$^{-1}$.

EXAMPLES 2 & 3

In a 200-ml volume four-necked flask equipped with a stirrer, a thermometer, a water receiver and a nitrogen inlet were placed 10 g of maleic anhydride-isobutylene copolymer (same as in Example 1) and 50 ml of anhydrous dimethylformamide. The mixture was stirred to convert it into a solution, and in the solution was dissolved p-aminophenol in the amount set forth in Table 1. To the resulting mixture were added 1.2 g of tri-n-butylamine and 15 ml of toluene. The resulting mixture was heated 140° C. under passing a nitrogen gas into the mixture to distil off water (which was produced by cyclizationdehydration reaction) together with toluene into the water receiver. After lapse of 2 hours, 10 ml of toluene was added to the reaction mixture. This cyclizationdehydration reaction was continued for 4 hours under returning distilled toluene from the water receiver.

After the reaction was complete, the reaction mixture was treated in the same manner as in Example 1 to obtain a purified N-(p-hydroxyphenyl)maleimide-isobutylene copolymer.

The yields, elementary analyses, and other measured values of the resulting copolymers are given in Table 1.

TABLE 1

| Ex. | p-Amino phenol (g) | Yield (%) | Elementary Analysis (%) C | H | N | Conversion ratio (%) | Mn | Tg (°C.) |
|---|---|---|---|---|---|---|---|---|
| 2 | 7.10 | 13.8 | 66.29 | 6.51 | 5.12 | 85 | 40,980 | 195 |
| 3 | 3.55 | 12.5 | 65.60 | 7.12 | 3.37 | 48 | 28,570 | 162 |

Figure 2:
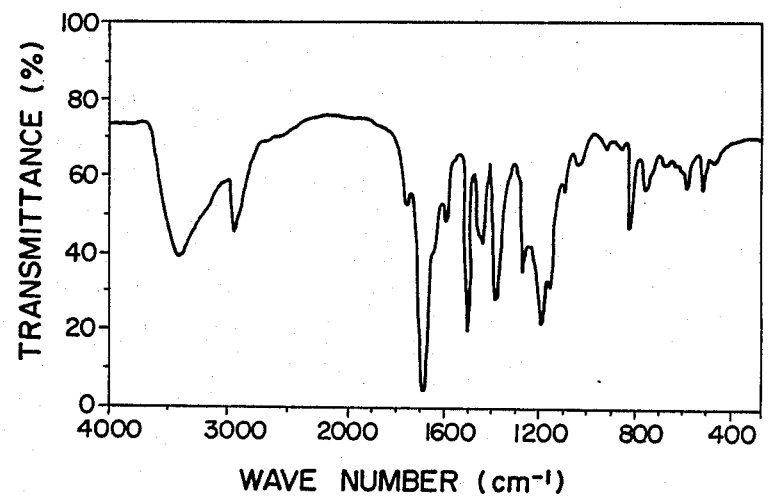

The IR spectrum of the product obtained in Example 2 is shown in FIG. 2.

EXAMPLE 4-6

The procedure of Example 1 was repeated except that p-aminophenol was replaced with o-aminophenol or m-aminophenol and that the reaction period was changed to the period set forth in Table 2 to prepare N-(o-hydroxyphenyl)maleimide copolymer or N-(m-hydroxyphenyl)maleimide copolymer.

The yields, elementary analyses, and other measured values of the resulting copolymer are given in Table 3.

TABLE 2

| | | Reaction Period (hrs.) | |
|---|---|---|---|
| Example | Aminophenol | First step | Second step |
| 4 | o-aminophenol | 9 | 9 |
| 5 | o-aminophenol | 2 | 4 |
| 6 | m-aminophenol | 3 | 4 |

TABLE 3

| Ex. | Yield (%) | Elementary Analysis (%) C | H | N | Conversion ratio (%) | Mn | Tg (°C.) |
|---|---|---|---|---|---|---|---|
| 4 | 14.0 | 67.70 | 6.35 | 5.76 | 100 | 41,600 | 173 |
| 5 | 14.0 | 66.39 | 6.32 | 5.10 | 84 | 33,700 | 170 |
| 6 | 13.4 | 67.67 | 6.51 | 5.23 | 84 | 36,500 | 202 |

Figure 3:
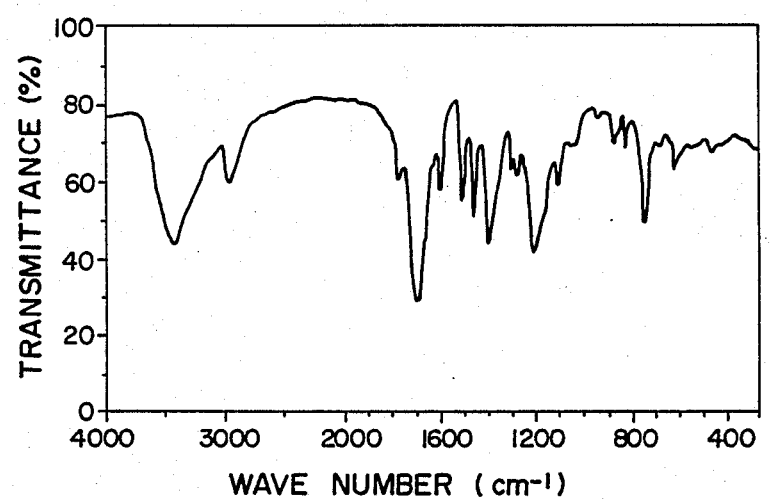

The IR spectrum of the product obtained in Example 4 is shown in FIG. 3. As is shown in FIG. 3, there are observed an absorption assigned to phenolic OH at 3,400 cm$^{-1}$, an absorption assigned to carbonyl of imide at 1,700 cm$^{-1}$ and an absorption assigned to ortho-substituted phenyl at 750 cm$^{-1}$, In the IR spectrum of the product obtained in Example 6, there were observed an absorption assigned to phenolic OH at 3,400 cm$^{-1}$, an absorption assigned to carbonyl of imide at 1,700 cm$^{-1}$ and an absorption assigned to meta-substituted phenyl at 690 cm$^{-1}$.

EXAMPLES 7 & 8

In 200 ml of methyl ethyl ketone were dissolved 19.4 g of maleic anhydride and 20.6 g of styrene, and to the solution was added 0.65 g of azobisisobutylnitrile(AIBN). The resulting mixture was heated at 60° C. for 2 hours under nitrogen atmosphere for performing polymerization. The reaction solution was then dropwise added to 500 ml of ethyl ether under stirring to precipitate a polymer. Thus precipitated polymer was collected by filtration and purified by repeating twice the THF dissolution-ethyl ether precipitation procedure described in Example 1. Thus purified polymer was dried under vacuum at 100° C. for 24 hours to give 31.5 g of a maleic anhydride-styrene copolymer. It was confirmed by elementary analysis that the copolymerization ratio was approximately 1:1. Mn was 55,400.

The procedure of Example 1 was repeated except that the maleic anhydride-isobutylene copolymer was replaced with the above-obtained maleic anhydride-styrene copolymer and the reaction conditions were changed as indicated in Table 4, to obtain an N-(hydroxyphenyl)maleimide-styrene copolymer.

The yields, elementary analyses, and other measured values of the resulting copolymer are given in Table 5.

TABLE 4

| Ex. | Aminophenol (g) | Tri-n-butyl amine (g) | Reaction Period (hrs.) First step | Second step |
|---|---|---|---|---|
| 7 | p-aminophenol 10.9 | 7.0 | 9 | 9 |
| 8 | o-aminophenol 10.9 | 7.0 | 9 | 9 |

TABLE 5

| Ex. | Yield (%) | Elementary Analysis (%) C | H | N | Conversion ratio (%) | $\overline{Mn}$ | Tg (°C.) |
|---|---|---|---|---|---|---|---|
| 7 | 13.4 | 72.69 | 5.28 | 4.91 | 100 | 69,820 | 250 |
| 8 | 12.9 | 72.24 | 5.31 | 5.07 | 100 | 68,450 | 210 |

Note: The theoretical values of elementary analysis of maleic anhydride-styrene copolymer based on the imidation ratio of 100% are C: 73.71%, H: 5.15%, N: 4.78%.

Figure 4:
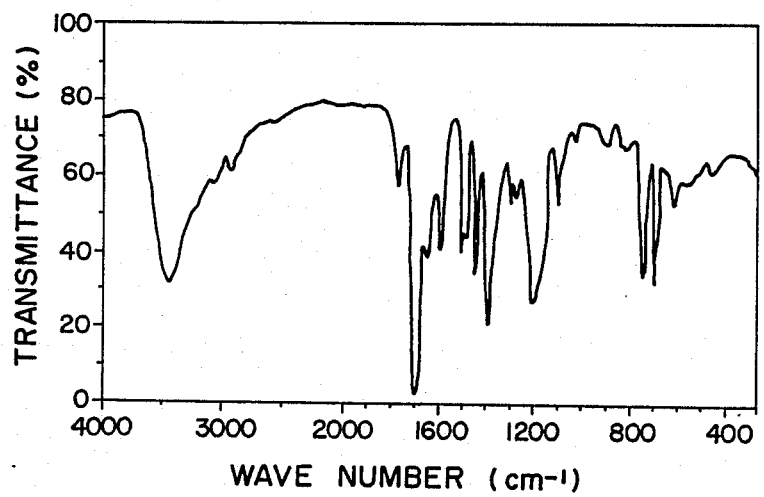

The IR spectrum of the product obtained in Example 8 is shown in FIG. 4. As is shown in FIG. 4, there are observed an absorption assigned to phenolic OH at 3,400 cm$^{-1}$, an absorption assigned to carbonyl of imide at 1,700 cm$^{-1}$, an absorption assigned to ortho-substituted phenyl at 750 cm$^{-1}$, and an absorption assigned to phenyl of styrene at 700 cm$^{-1}$.

EXAMPLES 9–17

The procedure of Example 1 was repeated except that the maleic anhydride-isobutylene copolymer was replaced with one of the following maleic anhydride-styrene copolymers (all were produced by Kawahara Yuka Co., Ltd., Japan):

SMA-1000 (copolymerization ratio MA:St=1:1)
SMA-2000 (copolymerization ratio MA:St=1:2)
SMA-3000 (copolymerization ratio MA:St=1:2.6)

wherein MA and St mean maleic anhydride and styrene, respectively, and the reaction conditions were changed as indicated in Table 6, to obtain an N-(hydroxyphenyl)maleimide-styrene copolymer.

The yields, elementary analyses, and other measured values of the resulting copolymer are given in Table 7.

TABLE 6

| Ex. | Starting Coplymer | Aminophenol g | Tertiary Amine(g) | First Step (hrs.) | Second Step (°C.) (hrs.) |
|---|---|---|---|---|---|
| 9 | SMA-1000 | p-amino phenol 8.1 | tri-n-butyl amine 3.1 | 4 | 140, 4 |
| 10 | SMA-1000 | m-amino-phenol 8.1 | tri-n-butyl amine 3.1 | 2 | 140, 3 |
| 11 | SMA-1000 | o-amino-phenol 8.1 | tri-n-butyl amine 4.5 | 2 | 140, 3 |
| 12 | SMA-2000 | p-amino-phenol 5.34 | tri-n-hexyl amine 4.5 | 2 | 140, 4 |
| 13 | SMA-2000 | m-amino-phenol 5.34 | tri-n-hexyl amine 4.5 | 2 | 140, 3 |
| 14 | SMA-2000 | o-amino-phenol 5.34 | tri-n-hexyl amine 4.5 | 2 | 140, 3 |
| 15 | SMA-3000 | p-amino-phenol 4.0 | tri-n-propyl amine 2.4 | 2 | 130, 4 |
| 16 | SMA-3000 | m-amino-phenol 4.0 | tri-n-propyl amine 2.4 | 2 | 130, 3 |
| 17 | SMA-3000 | o-amino-phenol 4.0 | tri-n-propyl amine 2.4 | 2 | 130, 3 |

TABLE 7

| Ex. | Yield (%) | Elementary Analysis (%) C | H | N | Conversion ratio (%) | $\overline{Mn}$ | Tg (°C.) |
|---|---|---|---|---|---|---|---|
| 9 | 13.0 | 73.38 | 5.58 | 5.03 | 100 | 5,080 | 195 |
| 10 | 12.3 | 73.60 | 5.50 | 4.60 | 95 | 4,540 | 185 |
| 11 | 12.0 | 72.79 | 5.34 | 4.99 | 100 | 4,480 | 185 |
| 12 | 10.4 | 76.87 | 6.01 | 3.55 | 100 | 7,360 | 172 |
| 13 | 11.0 | 77.93 | 5.99 | 3.50 | 100 | 7,200 | 180 |
| 14 | 9.0 | 77.05 | 5.80 | 3.70 | 100 | 6,630 | 183 |
| 15 | 9.0 | 79.11 | 6.19 | 2.96 | 100 | 9,310 | 170 |
| 16 | 9.0 | 80.02 | 6.11 | 3.10 | 100 | 9,350 | 175 |
| 17 | 8.8 | 79.72 | 6.03 | 3.06 | 100 | 8,460 | 175 |

Figure 5:
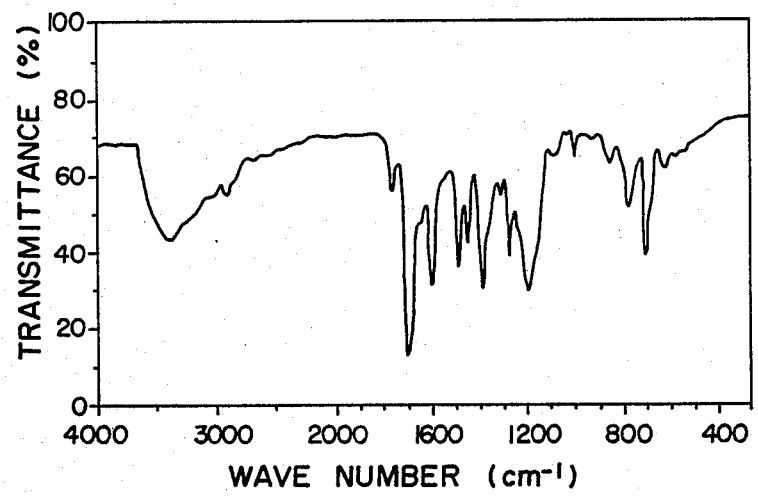

The IR spectrum of the product obtained in Example 10 is shown in FIG. 5. As is shown in FIG. 5, there are observed an absorption assigned to phenolic OH at 3,400 cm$^{-1}$, an absorption assigned to carbonyl of imide at 1,700 cm$^{-1}$, an absorption assigned to metha-substituted phenyl at 690 cm$^{-1}$, and an absorption assigned to phenyl of styrene at 700 cm$^{-1}$.

EXAMPLES 18–20

In 200 ml of methyl ethyl ketone were dissolved 18.14 g of maleic anhydride and 21.86 g of α-methylstyrene, and to the solution was added 1.82 g of azobisisobutylnitrile (AIBN). The resulting mixture was heated at 60° C. for 7 hours under nitrogen atmosphere for performing polymerization. The reaction solution was then dropwise added to 500 ml of ethyl ether under stirring to precipitate a polymer. Thus precipitated polymer was collected by filtration and purified by repeating twice the THF dissolution-ethyl ether precipitation procedure described in Example 1. Thus purified polymer was dried under vacuum at 100° C. for 24 hours to give 17.0 g of a maleic anhydride-styrene copolymer. It was confiremed by elementary analysis that the copolymerization ratio was approximately 1:1. Mn was 11,730.

The procedure of Example 1 was repeated except that the maleic anhydride-isobutylene copolymer was replaced with the above-obtained maleic anhydride-α-methylstyrene copolymer and the reaction conditions were changed as indicated in Table 8, to obtain an N-(p-hydroxyphenyl)-maleimide-α-methylstyrene copolymer.

The yields, elementary analyses, and other measured values of the resulting copolymer are given in Table 9.

TABLE 8

| Ex. | Aminophenol (g) | Tri-n-butyl amine (g) | Reaction Period (hrs.) First step | Second step |
|---|---|---|---|---|
| 18 | p-aminophenol 7.56 | 3.1 | 2 | 3 |

TABLE 8-continued

| Ex. | Aminophenol (g) | Tri-n-butyl amine (g) | Reaction Period (hrs.) First step | Second step |
|---|---|---|---|---|
| 10 | m-aminophenol 7.50 | 3.1 | 2 | 3 |
| 20 | o-aminophenol 7.56 | 3.1 | 2 | 3 |

TABLE 9

| Ex. | Yield (%) | Elementary Analysis (%) C | H | N | Conversion ratio (%) | Mn | Tg (°C.) |
|---|---|---|---|---|---|---|---|
| 18 | 12.0 | 73.64 | 5.88 | 4.40 | 95 | 13,400 | 233 |
| 19 | 13.2 | 73.85 | 5.66 | 4.66 | 100 | 14,220 | 230 |
| 20 | 12.1 | 73.92 | 5.70 | 4.60 | 100 | 12,500 | 227 |

Figure 6:
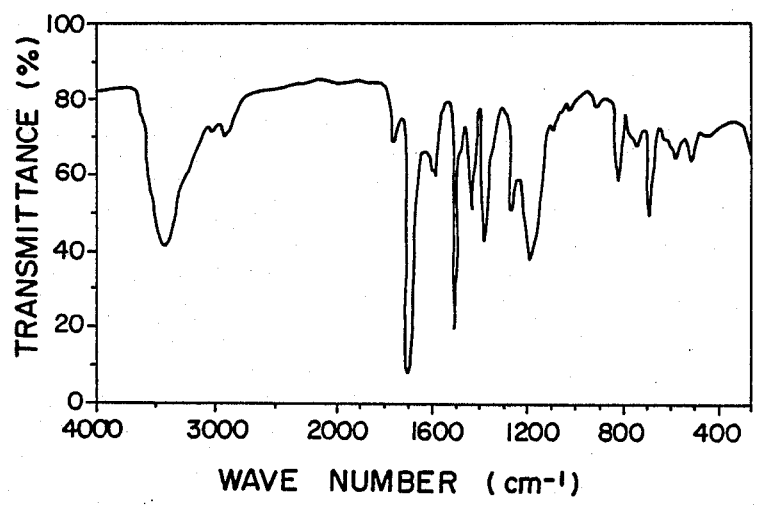

The IR spectrum of the product obtained in Example 18 is shown in FIG. 6. As is shown in FIG. 6, there are observed an absorption assigned to phenolic OH at 3,400 cm$^{-1}$, an absorption assigned to carbonyl of imide at 1,700 cm$^{-1}$, an absorption assigned to para-substituted phenyl at 830 cm$^{-1}$, and an absorption assigned to phenyl of α-methylstyrene at 700 cm$^{-1}$.

EXAMPLE 21

In a 200-ml volume four-necked flask equipped with a stirrer, a thermometer, a water receiver (i.e., water content-measurable receiver) and a nitrogen inlet were placed 10 g of maleic anhydride-styrene copolymer (copolymerization ratio=1:1, SMA-1000, tradename, Kawahara Yuka Co., Ltd., Japan) and 50 ml of anhydrous dimethylformamide. The mixture was stirred to convert it into a solution, and in the solution was dissolved 9.1 g of 3-methyl-p-aminophenol. The resulting solution was heated to 80° C. for 2 hours under stirring to prepare N-(2-methyl-p-hydroxyphenyl)maleamic acid copolymer—First Step. To the reaction mixture were added 3.1 g of tri-n-butylamine and 15 ml of toluene. The resulting mixture was heated 140° C. under passing a nitrogen gas into the mixture to distill off water (which was produced by cyclization-dehydration reaction) together with toluene into the water receiver. After lapse of one hour, 10 ml of toluene was added to the reaction mixture. This cyclization-dehydration reaction was continued for 4 hours under returning distilled toluene from the water receiver—Second Step.

After the reaction was complete, the reaction mixture was cooled to a temperature lower than 40° C. and poured into 300 ml of ethyl ether to precipitate the obtained polymer. The mixture was allowed to stand and the supernatant was removed. The precipitated polymer was washed with 200 ml of ethyl ether and dissolved in 150 ml of tetrahydrofuran (THF). The resulting solution was dropped into 700 ml of ethyl ether to precipitate a powdery polymer. The polymer was collected by filtration and purified by the above THF dissolution-ethyl ether precipitation procedure. Thus purified polymer was dried under vacuum at 100° C. for 24 hours to give 11.6 g of N-(2-methyl-p-hydroxyphenyl)maleimide-styrene copolymer.

Elementary analysis gave C: 75.35% (74.24%), H: 5.80% (5.59%), N: 4.60% (4.56%), in which the values in the parenthesis are theoretical values based on the imidation ratio of 100%. Accordingly, it was confirmed that 100% of the maleic anhydride units of the starting maleic anhydride-isobutylene copolymer was converted into N-(2-methyl-p-hydroxyphenyl)maleimide units. The number average molecular weight ($\overline{Mn}$) was 4,890 and the glass transition temperature was 220° C.

Figure 7:
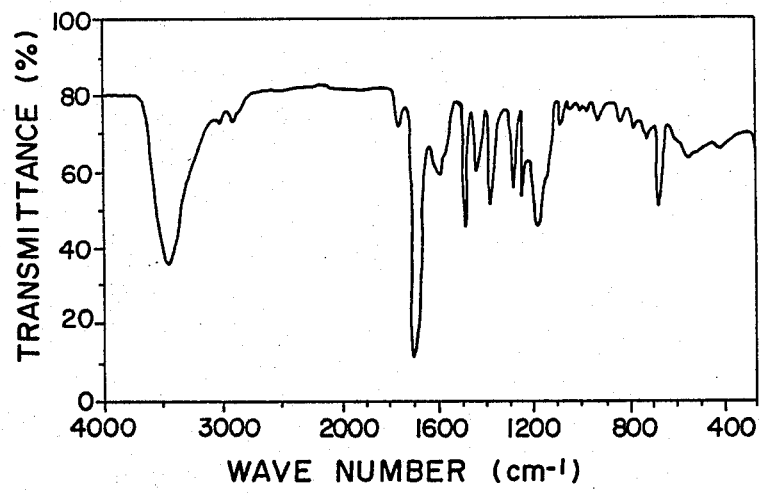

The IR spectrum of the product is shown in FIG. 7. As is shown in FIG. 7, there are observed an absorption assigned to phenolic OH at 3,400 cm$^{-1}$, an absorption assigned to carbonyl of imide at 1,700 cm$^{-1}$ and an absorption assigned to phenyl of styrene unit at 700 cm$^{-1}$.

EXAMPLE 22

In a 200-ml volume four-necked flask equipped with a stirrer, a thermometer, a water receiver and a nitrogen inlet were placed 20 g of maleic anhydride-styrene copolymer (same as in Example 21) and 100 ml of anhydrous dimethylformamide. The mixture was stirred to convert it into a solution, and in the solution was dissolved 21.3 g of 4-chloro-o-aminophenol. The resulting solution was heated to 80° C. for 9 hours under stirring to prepare N-(3-chloro-o-hydroxyphenyl)maleamic acid copolymer—First Step. To the reaction mixture were added 6.1 g of tri-n-butylamine and 30 ml of toluene. The resulting mixture was heated 140° C. under passing a nitrogen gas into the mixture to distil off water (which was produced by cyclization-dehydration reaction) together with toluene into the water receiver. After lapse of one hour, 20 ml of toluene was added to the reaction mixture. This cyclization-dehydration reaction was continued for 4 hours under returning distilled toluene from the water receiver—Second Step.

After the reaction was complete, the reaction mixture was treated in the same manner as in Example 21 to obtain a purified N-(3-chloro-o-hydroxyphenyl)maleimide-maleic anhydride-styrene copolymer.

The yield, elementary analysis, and other measured values of the resulting copolymer are given in Table 10.

Figure 8:
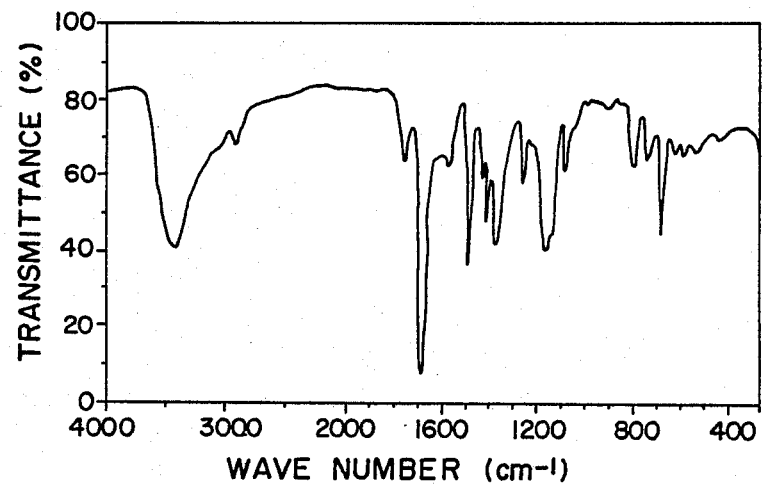

The IR spectrum of the product is shown in FIG. 8. As is shown in FIG. 8, there are observed an absorption assigned to phenolic OH at 3,400 cm$^{-1}$, an absorption assigned to carbonyl of imide at 1,700 cm$^{-1}$ and an absorption assigned to phenyl of styrene unit at 700 cm$^{-1}$.

EXAMPLE 23

The procedure of Example 21 was repeated except that the maleic anhydride-styrene copolymer was replaced with maleic anhydride-isobutylene copolymer (copolymerization ratio=1:1, ISOBAN-04, tradename, Kuraray Isoprene Chemical Co., Ltd., Japan) and the amount of 3-methyl-o-aminophenol employed was changed to 12 g, to prepare N-(2-methyl-p-hydroxyphenyl)maleimide-maleic anhydride-isobutylene copolymer.

The yield, elementary analysis, and other measured values of the resulting copolymer are given in Table 10.

Figure 9:
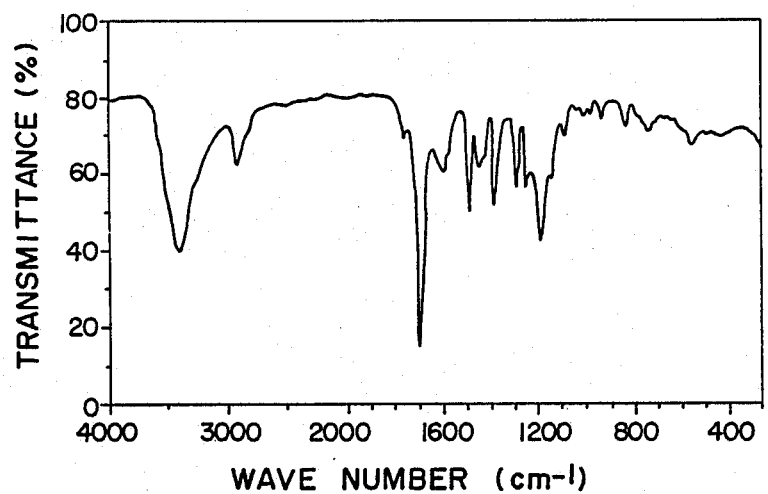

The IR spectrum of the product is shown in FIG. 9. As is shown in FIG. 9, there are observed an absorption assigned to phenolic OH at 3,400 cm$^{-1}$, an absorption assigned to carbonyl of imide at 1,700 cm$^{-1}$, and an absorption assigned to methyl of isobutylene at 2,950 cm$^{-1}$.

EXAMPLE 24

The procedure of Example 23 was repeated except that the aminophenol was replaced with 17.3 g of 2.6-dichloro-4-aminophenol, to prepare N-(2,3-dichloro-p-hydroxyphenyl)maleimide anhydride-isobutylene copolymer.

The yield, elementary analysis, and other measured values of the resulting copolymer are given in Table 10.

Figure 10:
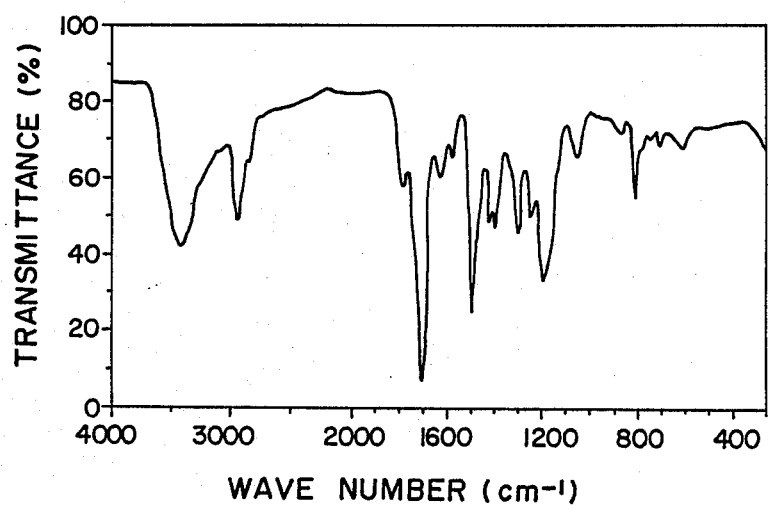

The IR spectrum of the product is shown in FIG. 10. As is shown in FIG. 10, there are observed an absorption assigned to phenolic OH at 3,400 cm$^{-1}$, an absorption assigned to carbonyl of imide at 1,700 cm$^{-1}$, and an absorption assigned to methyl of isobutylene at 2,950 cm$^{-1}$.

TABLE 10

| Ex. | Yield (%) | Elementary Analysis (%) | | | Conversion ratio (%) | Mn | Tg (°C.) |
|---|---|---|---|---|---|---|---|
| | | C | H | N | | | |
| 22 | 21.5 | 67.70 | 5.08 | 2.81 | 84 | 3,320 | 195 |
| | | 65.95 | 3.31 | 3.17 | | | |
| 23 | 13.9 | 67.95 | 6.92 | 4.80 | 83 | 34,430 | 241 |
| | | 69.47 | 6.62 | 5.40 | | | |
| 24 | 14.4 | 57.77 | 5.60 | 3.82 | 69 | 37,840 | 203 |
| | | 56.39 | 4.40 | 4.70 | | | |

Note: The values at the upper line in the column of Elementary analysis are values observed on the product and the values at the lower line are theoretical values based on the imidation ratio of 100%.

EXAMPLE 25

In a 200-ml volume four-necked flask equipped with a stirrer, a thermometer, a water receiver (i.e., water content-measurable receiver) and a nitrogen inlet were placed 10 g of maleic anhydride-isobutylene copolymer (copolymerization ratio=1:1, ISOBAN-04, tradename, Kuraray Isoprene Chemical Co., Ltd., Japan) and 50 ml of anhydrous dimethylformamide. The mixture was stirred to convert it into a solution, and in the solution were dissolved 3.02 g of aniline and 3.57 g of p-aminophenol. The resulting solution was heated to 80° C. for 3 hours under stirring to prepare a copolymer of N-(p-hydroxyphenyl)maleamic acid and N-phenylmaleamic acid—First Step. To the reaction mixture were added 7 g of tri-n-butylamine and 15 ml of toluene. The resulting mixture was heated 140° C. under passing a nitrogen gas into the mixture to distil off water (which was produced by cyclization-dehydration reaction) together with toluene into the water receiver. After lapse of one hour, 10 ml of toluene was added to the reaction mixture. This cyclization-dehydration reaction was continued for 4 hours under returning distilled toluene from the water receiver—Second Step.

After the reaction was complete, the reaction mixture was cooled to a temperature lower than 40° C. and poured into 300 ml of ethyl ether to precipitate the obtained polymer. The mixture was allowed to stand and the supernatant was removed. The precipitated polymer was washed with 200 ml of ethyl ether and dissolved in 150 ml of tetrahydrofuran (THF). The resulting solution was dropped into 700 ml of ethyl ether to precipitate a powdery polymer. The polymer was collected by filtration and purified by the above THF dissolution-ethyl ether precipitation procedure. Thus purified polymer was dried under vacuum at 100° C. for 24 hours to give 12.2 g of N-(p-hydroxyphenyl)-maleimide-N-phenylmaleimide-isobutylene copolymer.

Elementary analysis gave C: 68.24%, H: 6.86%, N: 4.86. Accordingly, it was confirmed that 80% of the maleic anhydride units of the starting maleic anhydrideisobutylene copolymer was converted into the imide-group containing unit. The ratio of N-(p-hydroxyphenyl)maleimide/N-phenylmaleimide, namely l/m, was 60/40. The number average molecular weight ($\overline{Mn}$) was 33,800 and the glass transition temperature was 215° C.

Figure 11:
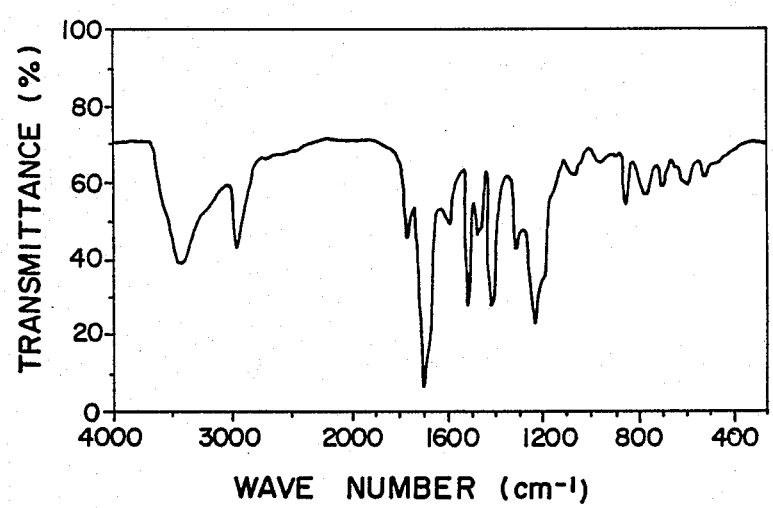

The IR spectrum of the product is shown in FIG. 11.

EXAMPLES 26–28

The procedure of Example 25 was repeated except that the amounts of p-aminophenol and aniline were changed into the amounts indicated in Table 11, to obtain a purified N-(p-hydroxyphenyl)maleimide-N-phenylmaleimide-isobutylene copolymer.

The yields, elementary analyses, and other measured values of the resulting copolymers are given in Table 11.

TABLE 11

| Ex. | p-Amino phenol/ Aniline (g) | Yield (%) | Elementary Analysis (%) | | | Conversion ratio (%) (l/m) | $\overline{Mn}$ | Tg (°C.) |
|---|---|---|---|---|---|---|---|---|
| | | | C | H | N | | | |
| 26 | 9.81 10.46 | 13.2 | 69.45 | 7.25 | 5.30 | 85 (50/50) | 31,600 | 215 |
| 27 | 8.49 1.21 | 13.5 | 67.79 | 6.38 | 5.39 | 91 (90/10) | 38,300 | 230 |
| 28 | 5.67 2.42 | 13.0 | 67.60 | 6.78 | 5.06 | 82 (80/20) | 34,000 | 205 |

EXAMPLE 29

The procedure of Example 25 was repeated except that 10 g of the maleic anhydride-isobutylene copolymer (ISOBAN-04) was replaced with 13.1 g of maleic anhydridestyrene copolymer (copolymerization ratio=1:1, SMA-1000, tradename of Kawahara Yuka Co., Ltd., Japan), to prepare 15.8 g of N-(p-hydroxyphenyl)-maleimide-N-phenyl-maleimide-styrene copolymer.

Elementary analysis gave C: 75.09%, H: 5.84%, N: 4.53. Accordingly, it was confirmed that 93% of the maleic anhydride units of the starting maleic anhydridestyrene copolymer was converted into the imide-group containing unit. The ratio of N-(p-hydroxyphenyl)-maleimide/N-phenylmaleimide, namely l/m, was 50/50. The number average molecular weight ($\overline{Mn}$) was 4,070 and the glass transition temperature was 192° C.

Figure 12:
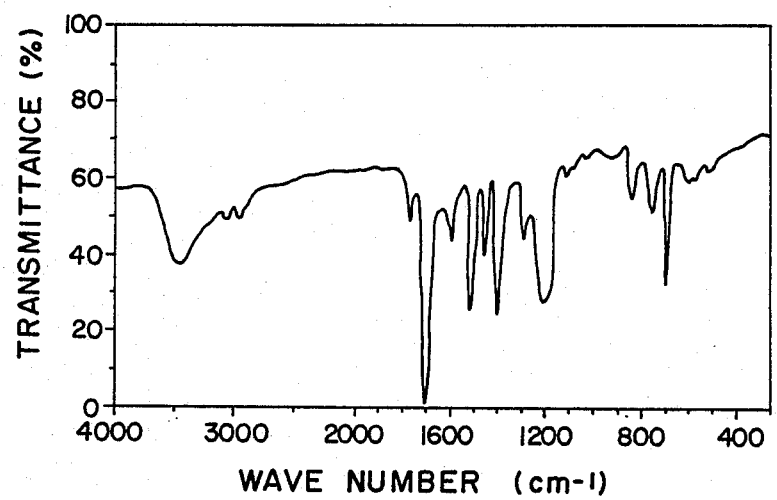

The IR spectrum of the product is shown in FIG. 12.

EXAMPLE 30

The procedure of Example 25 was repeated except that 3.02 g of aniline was replaced with 3.47 g of p-amino-toluene, to prepare 12.7 g of N-(p-hydroxyphenyl)maleimide-N-(p-methylphenyl)maleimide-isobutylene copolymer.

Elementary analysis gave C: 70.88%, H: 6.80%, N: 5.45. Accordingly, it was confirmed that 92% of the maleic anhydride units of the starting maleic anhydride-isobutylene copolymer was converted into the imide-group containing unit. The ratio of N-(p-hydroxyphenyl)maleimide/N-(p-methylphenyl)maleimide, namely l/m, was 50/50.

The number average molecular weight ($\overline{Mn}$) was 32,000 and the glass transition temperature was 225° C.

EXAMPLE 31

The procedure of Example 25 was repeated except that 3.02 g of aniline was repalced with 2.38 g of mono-n-butylamine, to prepare 13.3 g of N-(hydroxyphenyl)-maleimide-N-butylmaleimide-isobutylene copolymer.

Elementary analysis gave C: 67.16%, H: 8.39%, N: 5.11. Accordingly, it was confirmed that 77% of the maleic anhydride units of the starting maleic anhydride-isobutylene copolymer was converted into the imide-group containing unit. The ratio of N-(p-hydroxyphenyl)maleimide/N-butylphenylmaleimide, namely l/m, was 40/60. The number average molecular weight ($\overline{Mn}$) was 23,000 and the glass transition temperature was 180° C.

Figure 13:
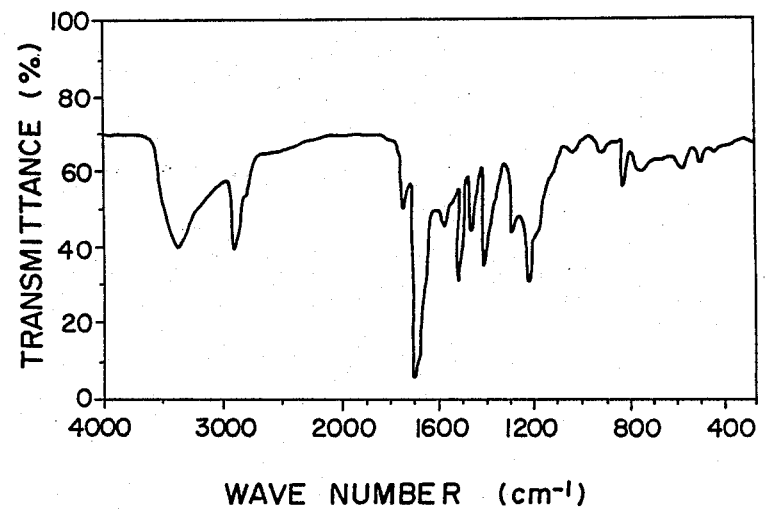

The IR spectrum of the product is shown in FIG. 13.

We claim:

1. An N-(hydroxyphenyl)maleimide-isobutylene copolymer having the following repeating units:

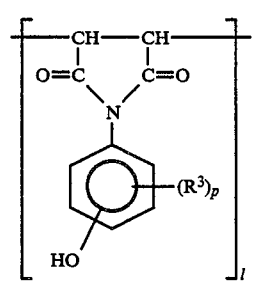

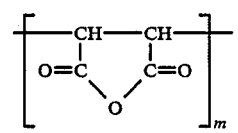

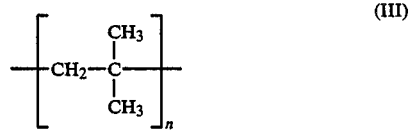

wherein $R^3$ is a halogen atom or a lower alkyl group having 1-5 carbon atoms; l, m and n are numbers satisfying conditions of $0.01 < n/(l+m) \leq 10$ and $0.2 < l/(l+m) \leq 1$; and p is an integer of 0-4.

2. The N-(hydroxyphenyl)maleimide copolymer as claimed in claim 1, wherein p is zero.

* * * * *